United States Patent
Weeks et al.

(10) Patent No.: US 9,885,149 B2
(45) Date of Patent: Feb. 6, 2018

(54) CARPET AND CARPET BACKING

(75) Inventors: Ronald J. Weeks, Lake Jackson, TX (US); Yi Jin, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 1461 days.

(21) Appl. No.: 12/499,667

(22) Filed: Jul. 8, 2009

(65) Prior Publication Data

US 2011/0008567 A1 Jan. 13, 2011

(51) Int. Cl.

| | | |
|---|---|---|
| D06N 7/00 | (2006.01) | |
| B32B 27/12 | (2006.01) | |
| B32B 27/32 | (2006.01) | |
| B60N 3/04 | (2006.01) | |
| B32B 5/02 | (2006.01) | |
| B32B 5/22 | (2006.01) | |
| B32B 5/24 | (2006.01) | |
| B32B 7/12 | (2006.01) | |
| B32B 27/06 | (2006.01) | |
| B32B 27/08 | (2006.01) | |
| B32B 27/18 | (2006.01) | |
| B32B 27/20 | (2006.01) | |
| B32B 27/30 | (2006.01) | |

(52) U.S. Cl.
CPC .......... *D06N 7/0076* (2013.01); *B32B 5/022* (2013.01); *B32B 5/024* (2013.01); *B32B 5/22* (2013.01); *B32B 5/245* (2013.01); *B32B 7/12* (2013.01); *B32B 27/065* (2013.01); *B32B 27/08* (2013.01); *B32B 27/12* (2013.01); *B32B 27/18* (2013.01); *B32B 27/20* (2013.01); *B32B 27/306* (2013.01); *B32B 27/308* (2013.01); *B32B 27/32* (2013.01); *B60N 3/048* (2013.01); *D06N 7/0068* (2013.01); *D06N 7/0071* (2013.01); *D06N 7/0078* (2013.01); *D06N 7/0081* (2013.01); *B32B 2255/02* (2013.01); *B32B 2255/26* (2013.01); *B32B 2262/0223* (2013.01); *B32B 2262/0246* (2013.01); *B32B 2262/0253* (2013.01); *B32B 2262/0276* (2013.01); *B32B 2266/0278* (2013.01); *B32B 2307/402* (2013.01); *B32B 2307/546* (2013.01); *B32B 2307/554* (2013.01); *B32B 2479/00* (2013.01); *D06N 2203/041* (2013.01); *D06N 2203/042* (2013.01); *D06N 2205/06* (2013.01); *D06N 2209/105* (2013.01); *D06N 2209/1628* (2013.01); *Y10T 428/23979* (2015.04)

(58) Field of Classification Search
CPC .. D06N 7/0071; D06N 7/0076; D06N 7/0081; D06N 2203/042; D06N 2205/06
USPC ..................................................... 428/95, 97
See application file for complete search history.

(56) References Cited

U.S. PATENT DOCUMENTS

| | | | | |
|---|---|---|---|---|
| 6,180,709 | B1 * | 1/2001 | Nishio et al. | 524/451 |
| 7,160,949 | B2 * | 1/2007 | Ota et al. | 525/242 |
| 7,338,698 | B1 | 3/2008 | Bieser et al. | |
| 7,355,089 | B2 * | 4/2008 | Chang et al. | 604/358 |
| 7,732,052 | B2 * | 6/2010 | Chang et al. | 428/424.8 |
| 7,737,061 | B2 * | 6/2010 | Chang et al. | 442/394 |
| 7,737,215 | B2 * | 6/2010 | Chang et al. | 525/88 |
| 7,803,865 | B2 * | 9/2010 | Moncla et al. | 524/523 |
| 7,846,552 | B2 * | 12/2010 | Weeks | 428/500 |
| 7,847,029 | B2 * | 12/2010 | Butler et al. | 525/240 |
| 7,910,658 | B2 * | 3/2011 | Chang et al. | 525/191 |
| 7,947,776 | B2 * | 5/2011 | Moncla et al. | 524/523 |
| 8,043,713 | B2 * | 10/2011 | Wevers et al. | 428/523 |
| 8,124,234 | B2 * | 2/2012 | Weaver et al. | 428/423.1 |
| 8,288,470 | B2 * | 10/2012 | Ansems et al. | 524/576 |
| 2003/0055179 | A1 * | 3/2003 | Ota et al. | 525/242 |
| 2006/0199907 | A1 * | 9/2006 | Chang et al. | 525/191 |
| 2007/0078222 | A1 * | 4/2007 | Chang et al. | 525/88 |
| 2007/0095453 | A1 | 5/2007 | Brumbelow et al. | |
| 2007/0155900 | A1 * | 7/2007 | Chang et al. | 525/88 |
| 2007/0160833 | A1 | 7/2007 | Maak et al. | |
| 2007/0292705 | A1 * | 12/2007 | Moncla et al. | 428/523 |
| 2008/0177242 | A1 * | 7/2008 | Chang et al. | 604/385.01 |
| 2008/0234435 | A1 * | 9/2008 | Chang et al. | 525/240 |
| 2008/0280517 | A1 * | 11/2008 | Chang et al. | 442/104 |
| 2008/0292833 | A1 * | 11/2008 | Wevers et al. | 428/96 |
| 2009/0118426 | A1 * | 5/2009 | Mitani et al. | 525/95 |

(Continued)

FOREIGN PATENT DOCUMENTS

| | | |
|---|---|---|
| GB | 2072578 A | 10/1981 |
| WO | 93/15909 A1 | 8/1993 |
| WO | 98/38376 A1 | 9/1998 |
| WO | 2008/12449 A2 | 10/2008 |
| WO | 2009/086091 A1 | 7/2009 |
| WO | 2010/075251 A1 | 7/2010 |

*Primary Examiner* — Cheryl Juska

(74) *Attorney, Agent, or Firm* — Husch Blackwell LLP

(57) ABSTRACT

The present invention pertains to carpet and carpet tile. In one aspect, the carpet includes (a) a primary backing which has a face and a back surface, (b) a plurality of fibers attached to the primary backing and extending from the face of the primary backing and exposed at the back surface of the primary backing, (c) an adhesive backing, (d) an optional secondary backing adjacent to the adhesive backing, and (e) at least one non-chlorinated, non-polyvinyl butyral thermoplastic polymer or composition having a specific growth tension at 40 C and a specific residual stress at 25% strain. Additional steps and procedures include washing or scouring the primary backing and fibers prior to the extrusion step, and utilizing implosion agents. The preferred olefin block copolymer are ethylene based block interpolymers. The constructions and methods described herein are particularly suited for making tufted, broad-loom carpet having improved abrasion resistance.

14 Claims, No Drawings

(56) References Cited

U.S. PATENT DOCUMENTS

| | | |
|---|---|---|
| 2009/0172970 A1* | 7/2009 | Prieto et al. .................... 36/71 |
| 2010/0029827 A1* | 2/2010 | Ansems et al. ............... 524/451 |
| 2010/0062209 A1* | 3/2010 | Wevers et al. ................. 428/95 |
| 2010/0272946 A1* | 10/2010 | Pepper et al. ................. 428/90 |
| 2010/0292403 A1* | 11/2010 | Ansems et al. ............... 525/125 |
| 2010/0310858 A1* | 12/2010 | Wevers et al. ............... 428/327 |
| 2011/0003524 A1* | 1/2011 | Claasen et al. ............... 442/329 |
| 2011/0081529 A1* | 4/2011 | Richeson et al. ............. 428/212 |
| 2011/0187018 A1* | 8/2011 | Peng et al. ............... 264/211.12 |
| 2011/0262747 A1* | 10/2011 | Yalvac et al. .......... 428/355 EN |
| 2012/0325403 A1* | 12/2012 | Chereau et al. ............. 156/285 |
| 2013/0030123 A1* | 1/2013 | Martin et al. ................... 525/95 |
| 2013/0048204 A1* | 2/2013 | Chang et al. ............ 156/244.11 |
| 2013/0059989 A1* | 3/2013 | Ansems et al. ............. 525/92 C |

* cited by examiner

CARPET AND CARPET BACKING

BACKGROUND OF THE INVENTION

This invention relates to carpets, carpet tile and carpet backing. While there have been many attempts to bind carpet fibers together using various polymers, such as polyethylene and polypropylene, there continues to be a need for a polymer based system that is both easily applied and still maintains enough flexibility while at the same time minimizing "growth," especially at elevated temperatures.

BRIEF SUMMARY OF THE INVENTION

The invention provides a carpet or carpet tile comprising a primary backing material having a face and a back side, a plurality of fibers attached to the primary backing material and extending from the face of the primary backing material and exposed at the back side of the primary backing material, an optional precoat, an adhesive backing material, an optional dimensional stability layer, an optional cap coat material, and an optional secondary backing material adjacent to the dimensional stability layer or adhesive backing material, wherein at least one of the plurality of fibers, the primary backing material, the optional precoat layer, the adhesive backing material, the optional dimensional stability layer, or the optional secondary backing material comprises at least one non-chlorinated, non-polyvinyl butyral thermoplastic polymer or composition having a growth tension at 40 C of less than about 25 psi and a residual stress at 25% strain of less than about 63%, preferably wherein the at least one non-chlorinated, non-polyvinyl butyral thermoplastic polymer or composition having a growth tension at 40 C of less than about 20 psi. The at least one non-chlorinated, non-polyvinyl butyral thermoplastic polymer or composition can have a residual stress at 25% strain of less than about 60%, more preferably less than about 55%, and/or a growth tension at 40 C of less than or equal to about 10 psi.

The at least one non-chlorinated, non-polyvinyl butyral thermoplastic polymer or composition can be selected from the group consisting of ethylene/vinyl acetate (EVA) polymers, ethylene methyl acrylate (EMA) polymers, amorphous poly-alpha-olefin (APAO) polymers, olefin block copolymers (OBC), and homogeneously branched ethylene polymers. The at least one non-chlorinated, non-polyvinyl butyral thermoplastic polymer or composition can have a storage modulus (G') of greater than 4.3 MPa at 70° C. The at least one non-chlorinated, non-polyvinyl butyral thermoplastic polymer or composition can further comprise at least one tackifier.

The carpet or carpet tile can have an olefin block copolymer comprising an ethylene block interpolymer characterized as having at least one or more of the following characteristics:

(a) has a Mw/Mn from about 1.7 to about 3.5, at least one melting point, Tm, in degrees Celsius, and a density, d, in grams/cubic centimeter, wherein the numerical values of Tm and d correspond to the relationship: $Tm > -2002.9 + 4538.5(d) - 2422.2(d)^2$; or (b) has a Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$\Delta T > -0.1299(\Delta H) + 62.81$ for ΔH greater than zero and up to 130 J/g, $\Delta T \geq 48°$ C. for ΔH greater than 130 J/g, wherein the CRYSTAF peak is determined using at least 5 percent of the cumulative polymer, and if less than 5 percent of the polymer has an identifiable CRYSTAF peak, then the CRYSTAF temperature is 30° C.; or (c) is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when the ethylene/α-olefin interpolymer is substantially free of a cross-linked phase: $Re > 1481 - 1629(d)$; or (d) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and a melt index, density, and molar comonomer content (based on the whole polymer) within 10 percent of that of the ethylene/α-olefin interpolymer; or (e) is characterized by a storage modulus at 25° C., G'(25° C.), and a storage modulus at 100° C., G'(100° C.), wherein the ratio of G'(25° C.) to G'(100° C.) is from about 1:1 to about 10:1 and, preferably, wherein the ethylene/α-olefin block interpolymer is mesophase separated such as described in PCT/US09/032699 and U.S. provisional Ser. No. 61/024,674 for the multiblocks and the controlled sequence distribution cases (diblocks) are PCT/US09/032705 and U.S. provisional Ser. No. 61/024,688.

The carpet or carpet tile precoat is preferably not optional.

The carpet of the invention is disclosed, wherein (i) the fibers, primary backing, adhesive backing and optional secondary backing all comprise a polyolefin multi-block polymer, (ii) the olefin monomer chemistry of the adhesive backing differs from that of the fibers and the primary backing, and (iii) the carpet includes a label or literature at the time of sale which represents that the carpet is recyclable without segregation of carpet components.

The carpet or carpet tile of the invention is disclosed, wherein the cap coat material or the adhesive backing material further comprises (a) at least one filler in an amount of greater than 0% and up to about 90% by weight based on the total weight of the material, wherein the filler is selected from the group consisting of coal fly ash, ATH, $CaCO_3$, talc, recycled glass, magnesium hydroxide, ground up tires, and ground up carpet, (b) optionally, at least one other polymer selected from the group consisting of MAH-g-HDPE, EEA, and EAA (c) optionally, at least one oil, (d) optionally, a color additive such as carbon black, and (e) from 0 to about 15 weight percent of at least one tackifier.

DETAILED DESCRIPTION OF THE INVENTION

This invention relates to carpets and methods of making carpets, wherein, for each, the carpets comprise at least one flexible ethylene polymer backing material. In a particular instance, the invention relates to a carpet and a method of making a carpet by an extrusion coating technique, wherein for each the carpet comprises a backing material comprised of at least one olefin block copolymer, especially ethylene based block copolymers.

The present invention pertains to any carpet constructed with a primary backing material and includes tufted carpet and non-tufted carpet such as needle punched carpet. Although specific embodiments are amenable to tufted and non-tufted carpet, tufted carpet is preferred.

The carpet backing formulations, especially those using ethylene block copolymers, have improved sustainability together with higher filler loadings.

The precoat backing material, the adhesive backing material or the cap coat backing material can comprise at least one olefin block copolymer.

The precoat can comprise olefin block copolymer applied as a polyolefin dispersion, as a hot melt adhesive polyolefin dispersion, as a hot melt adhesive, as a powder coating, as an extrusion coating, whether applied as a single layer or multilayer extrusion.

The adhesive layer comprising olefin block copolymer can be applied as an extrusion coating, whether applied as a single layer or multilayer extrusion, or as a hot melt.

The cap coat or secondary backing layer comprising olefin block copolymer is applied as an extrusion coating, whether applied as a single layer or multilayer extrusion, or as a hot melt.

Tufted carpets are composite structures which include yarn (which is also known as a fiber bundle), a primary backing material having a face surface and a back surface, an adhesive backing material and, optionally, a secondary backing material. To form the face surface of tufted carpet, yarn is tufted through the primary backing material such that the longer length of each stitch extends through the face surface of the primary backing material. Typically, the primary backing material is made of a woven or non-woven material such as a thermoplastic polymer, most commonly polypropylene or polyester.

The face of a tufted carpet can generally be made in three ways. First, for loop pile carpet, the yarn loops formed in the tufting process are left intact. Second, for cut pile carpet, the yarn loops are cut, either during tufting or after, to produce a pile of single yarn ends instead of loops. Third, some carpet styles include both loop and cut pile. One variety of this hybrid is referred to as tip-sheared carpet where loops of differing lengths are tufted followed by shearing the carpet at a height so as to produce a mix of uncut, partially cut, and completely cut loops. Alternatively, the tufting machine can be configured so as to cut only some of the loops, thereby leaving a pattern of cut and uncut loops. Whether loop, cut, or a hybrid, the yarn on the back side of the primary backing material comprises tight, unextended loops.

The combination of tufted yarn and a primary backing material without the application of an adhesive backing material or secondary backing material is referred to in the carpet industry as raw tufted carpet or greige goods.

Greige goods become finished tufted carpet with the application of an adhesive backing material and an optional secondary backing material to the back side of the primary backing material. Finished tufted carpet can be prepared as broad-loomed carpet in rolls typically 6 or 12 feet wide.

Alternatively, carpet can be prepared as carpet tiles, typically 18 inches square in the United States and 50 cm. square elsewhere.

The adhesive backing material is applied to the back face of the primary backing material to affix the yarn to the primary backing material. Typically, the adhesive backing material is applied by a pan applicator using a roller, a roll over a roller or a bed, or a knife (also called a doctor blade) over a roller or a bed. Properly applied adhesive backing materials do not substantially pass through the primary backing material.

Most frequently, the adhesive backing material is applied as a single coating or layer. The extent or tenacity to which the yarn is affixed is referred to as tuft lock or tuft bind strength. Carpets with sufficient tuft bind strength exhibit good wear resistance and, as such, have long service lives. Also, the adhesive backing material should substantially penetrate the yarn (fiber bundle) exposed on the backside of the primary backing material and should substantially consolidate individual fibers within the yarn.

Good penetration of the yarn and consolidation of fibers yields good abrasion resistance. Moreover, in addition to good tuft bind strength and abrasion resistance, the adhesive material should also impart or allow good flexibility to the carpet in order to facilitate easy installation of the carpet. The secondary backing material is typically a lightweight scrim made of woven or non-woven material such as a thermoplastic polymer, most commonly polypropylene. The secondary backing material is optionally applied to the backside of the carpet onto the adhesive backing material, primarily to provide enhanced dimensional stability to the carpet structure as well as to provide more surface area for the application of direct glue-down adhesives.

Alternative backing materials may also be applied to the backside of the adhesive backing material and/or to the backside of the secondary backing material, if present.

Alternative backing materials may include foam cushioning (e.g. foamed polyurethane) and pressure sensitive floor adhesives. Alternative backing materials may also be applied, for example, as webbing with enhanced surface area, to facilitate direct glue-down adhesive installations (e.g., in contract commercial carpeting, automobile carpet and airplane carpet where the need for cushioning is often minimal). Alternative backing materials can also be optionally applied to enhance barrier protection respecting moisture, insects, and foodstuffs as well as to provide or enhance fire suppression, thermal insulation, and sound dampening properties of the carpet.

Known adhesive backing materials include curable latex, urethane or vinyl systems, with latex systems being most common. Conventional latex systems are low viscosity, aqueous compositions that are applied at high carpet production rates and offer good fiber-to-backing adhesion, tuft bind strength and adequate flexibility. Generally, excess water is driven off and the latex is cured by passing through a drying oven. Styrene butadiene rubbers (SBR) are the most common polymers used for latex adhesive backing materials. Typically, the latex backing system is heavily filled with an inorganic filler such as calcium carbonate or Aluminum Trihydrate and includes other ingredients such as antioxidants, antimicrobials, flame retardants, smoke suppressants, wetting agents, and froth aids.

Conventional latex adhesive backing systems can have certain drawbacks. As one important drawback, typical latex adhesive backing systems do not provide a moisture barrier. Another possible drawback, particularly with a carpet having polypropylene yarn and polypropylene primary and secondary backing materials, is the dissimilar polymer of latex systems along with the inorganic filler can reduce the recyclability of the carpet.

In view of these drawbacks, some in the carpet industry have begun seeking suitable replacements for conventional latex adhesive backing systems. One alternative is the use of urethane adhesive backing systems. In addition to providing adequate adhesion to consolidate the carpet, urethane backings generally exhibit good flexibility and barrier properties and, when foamed, can eliminate the need for separate underlayment padding (i.e., can constitute a direct glue-down unitary backing system). However, urethane backing systems also have important drawbacks, including their relatively high cost and demanding curing requirements which necessitate application at slow carpet production rates relative to latex systems.

Thermoplastic polyolefins such as ethylene vinyl acetate (EVA) copolymers and low density polyethylene (LDPE) have also been suggested as adhesive backing materials due in part to their low cost, good moisture stability and no-cure requirements. Various methods are available for applying polyolefin backing materials, including powder coating, hot melt application and extruded film or sheet lamination.

However, using polyolefins to replace latex adhesive backings can also present difficulties. For example, U.S. Pat. No. 5,240,530, Table A at Col. 10, indicates that ordinary polyolefin resins possess inadequate adhesion for use in carpet construction. Additionally, relative to latex and other cured systems, ordinary polyolefins have relatively high application viscosities and relatively high thermal requirements. That is, ordinary thermoplastic polyolefins are characterized by relatively high melt viscosities and high recrystallization or solidification temperatures relative to the typical aqueous viscosities and cure temperature requirements characteristic of latex and other cured (thermosetting) systems.

Even ordinary elastomeric polyolefins, i.e. polyolefins having low crystallinities, generally have relatively high viscosities and relatively high recrystallization temperatures. High recrystallization temperatures result in relatively short molten times during processing and, combined with high melt viscosities can make it difficult to achieve adequate penetration of the yarn, especially at conventional adhesive backing application rates. One method for overcoming the viscosity and recrystallization deficiencies of ordinary polyolefins is to formulate the polyolefin resin as a hot melt adhesive which usually involves formulating low molecular weight polyolefins with waxes, tackifiers, various flow modifiers and/or other elastomeric materials. Ethylene/vinyl acetate (EVA) copolymers, for example, have been used in formulated hot melt adhesive backing compositions, and other polyolefins compositions have also been proposed as hot melt backing compositions. For example, in U.S. Pat. No. 3,982,051, Taft et al. disclose that a composition comprising an ethylene/vinyl acetate copolymer, atactic polypropylene and vulcanized rubber is useful as a hot melt carpet backing adhesive.

Unfortunately, hot melt adhesive systems are generally considered not completely suitable replacements for conventional latex adhesive backings. Typical hot melt systems based on EVA and other copolymers of ethylene and unsaturated comonomers can require considerable formulating and yet often yield inadequate tuft bind strengths. However, the most significant deficiency of typical hot melt system is their melt strengths which are generally too low to permit application by a direct extrusion coating technique. As such, polyolefin hot melt systems are typically applied to primary backings by relatively slow, less efficient techniques such as by the use of heated doctor blades or rotating melt transfer rollers.

While unformulated high pressure low density polyethylene (LDPE) can be applied by a conventional extrusion coating technique, LDPE resins typically have poor flexibility which can result in excessive carpet stiffness.

Conversely, those ordinary polyolefins that have improved flexibility, such as ultra low density polyethylene (ULDPE) and ethylene/propylene interpolymers, still do not possess sufficient flexibility, have excessively low melt strengths and/or tend to draw resonate during extrusion coating. To overcome extrusion coating difficulties, ordinary polyolefins with sufficient flexibility can be applied by lamination techniques to insure adequate yarn-to-backing adhesion; however, lamination techniques are typically expensive and can result in extended production rates relative to direct extrusion coating techniques.

Known examples of flexible polyolefin backing materials are disclosed in U.S. Pat. Nos. 3,390,035; 3,583,936; 3,745,054; and 3,914,489. In general, these disclosures describe hot melt adhesive backing compositions based on an ethylene copolymer, such as, ethylene/vinyl acetate (EVA), and waxes. Known techniques for enhancing the penetration of hot melt adhesive backing compositions through the yarn include applying pressure while the greige good is in contact with rotating melt transfer rollers as described, for example, in U.S. Pat. No. 3,551,231.

Another known technique for enhancing the effectiveness of hot melt systems involve using pre-coat systems. For example, U.S. Pat. Nos. 3,684,600; 3,583,936; and 3,745,054, describe the application of low viscosity aqueous pre-coats to the back surface of the primary backing material prior the application of a hot melt adhesive composition.

The hot melt adhesive backing systems disclosed in these patents are derived from multi-component formulations based on functional ethylene polymers such as, for example, ethylene/ethyl acrylate (EEA) and ethylene/vinyl acetate (EVA) copolymers.

Although there are various systems known in the art of carpet backings, there remains a need for a thermoplastic polyolefin carpet backing system which provides adequate tuft bind strength, good abrasion resistance and good flexibility to replace cured latex backing systems. A need also remains for an application method which permits high carpet production rates while achieving the desired characteristics of good tuft bind strength, abrasion resistance, barrier properties and flexibility. Finally, there is also a need to provide a carpet structure having fibers and backing materials that are easily recyclable without the necessity of extensive handling and segregation of carpet component materials. In accordance with one aspect of the present invention, a carpet comprises a plurality of fibers, a primary backing material having a face and a back side, an adhesive backing material and an optional secondary backing material, the plurality of fibers attached to the primary backing material and protruding from the face of the primary backing material and exposed on the back side of the primary backing material, the adhesive backing material disposed on the back side of the primary backing material and the optional secondary backing material adjacent to the adhesive backing material, wherein at least one of the plurality of fibers, the primary backing material, the adhesive backing material or the optional secondary backing material is comprised of at least one olefin block copolymer. Another aspect of the present invention is a method of making a carpet, the carpet including a plurality of fibers, a primary backing material having a face and a back side, an adhesive backing material and an optional secondary backing material, the plurality of fibers attached to the primary backing material and protruding from the face of the primary backing material and exposed on the back side of the primary backing material, the method comprising the step of extrusion coating the adhesive backing material or the optional secondary backing material onto the back side of the primary backing material, wherein the extrusion coated adhesive backing material or optional secondary backing material is comprised of at least one olefin block copolymer, especially ethylene based block interpolymers characterized as wherein the interpolymer is characterized by an average block index greater than zero and up to about 1.0 and a molecular weight distribution, $M_w/M_n$, greater than about 1.3. In another aspect, the invention relates to an ethylene/α-olefin interpolymer comprising polymerized units of ethylene and α-olefin, wherein the average block index is greater than 0 but less than about 0.4 and a molecular weight distribution, $M_w/M_n$, greater than about 1.3. Preferably, the interpolymer is a linear, multi-block copolymer with at least three blocks. Also preferably, the ethylene content in the interpolymer is at least 50 mole percent.

Another aspect of the present invention is a method of making a carpet, the carpet having a collapsed, non-expanded adhesive backing material matrix and comprising yarn attached to a primary backing material, the adhesive backing material comprising at least one ethylene polymer and is in intimate contact with the primary backing material and has substantially penetrated and substantially consolidated the yarn, the method comprising the step of adding an effective amount of at least one implosion agent to the adhesive backing material and thereafter activating the implosion agent during an extrusion coating step such that molten or semi-molten polymer is forced into the free space of yarn exposed on the backside of the primary backing material.

Another aspect of the present invention is a method of making a carpet, the carpet having a face surface and comprising yarn, a primary backing material, an adhesive backing material and an optional secondary backing material, wherein the primary backing material has a back surface opposite the face surface of the carpet, the yarn is attached to the primary backing material, the adhesive backing material is applied to the back surface of the primary backing material and the optional secondary backing material is applied onto the adhesive backing material, the method comprising the step of scouring, washing or flashing the back surface of the primary backing material with steam, solvent and/or heat prior to the application of the adhesive backing material to substantially remove or displace processing materials.

The terms "intimate contact," "substantial encapsulation," and/or "substantial consolidation" are used herein to refer to mechanical adhesion or mechanical interactions (as opposed to chemical bonding) between dissimilar carpet components, irrespective of whether or not one or more carpet component is capable of chemically interacting with another carpet component. With respect to the mechanical adhesion or interactions of the present invention, there may be some effective amount of intermixing or inter-melting of polymeric materials; however, there is no continuous or integral fusing of various components as determined from visual inspection of photomicrographs (at 20× magnification) of the various carpet interfaces. Within this meaning, fusion of yarn or fiber bundles or of individual fibers to one another within a fiber bundle is not considered integral fusion in itself since fibers are referred to herein as one carpet component.

The term "intimate contact" refers to the mechanical interaction between the back surface of the primary backing material and the adhesive backing material.

The term "substantial encapsulation" refers to the adhesive backing material significantly surrounding the yarn or fiber bundles at or in immediate proximity to the interface between the back surface of the primary backing material and the adhesive backing material. The term "substantial consolidation" refers to the overall integrity and dimensional stability of the carpet that is achieved by substantially encapsulating the yarn or fiber bundles and intimately contacting the back surface of the primary backing material with the adhesive backing material. A substantially consolidated carpet possesses good component cohesiveness and good delamination resistance with respect to the various carpet components.

The term "integral fusing" is used herein in the same sense as known in the art and refers to heat bonding of carpet components using a temperature above the melting point of the adhesive backing material. Integral fusing occurs when the adhesive backing material comprises the same polymer as either the fibers or primary backing material or both.

However, integral fusing does not occur when the adhesive backing material comprises a different polymer than the fibers and primary backing material. By the term "same polymer," it is meant that the monomer units of the polymers are of the same chemistry, although their molecular or morphological attributes may differ. Conversely, by the term "different polymer," it is meant that, irrespective of any molecular or morphological differences, the monomer units of the polymers are of different chemistries. Thus, in accordance with the various definitions of the present invention, a polypropylene primary backing material and a polyethylene adhesive backing material would not integrally fuse because these carpet components are of different chemistries. The term "carpet component" is used herein to refer separately to carpet fiber bundles, the primary backing material, the adhesive backing material and the optional secondary backing material.

The term "extrusion coating" is used herein in its conventional sense to refer to an extrusion technique wherein a polymer composition usually in pellet-form is heated in an extruder to a temperature elevated above its melt temperature and then forced through a slot die to form a semi-molten or molten polymer web. The semi-molten or molten polymer web is continuously drawn down onto a continuously fed greige good to coat the backside of the greige good with the polymer composition. An extrusion process can be useful in the present invention wherein, at the nip, the face surface of the greige good is oriented towards the chill roll and the back surface of the adhesive backing material oriented is towards the nip pressure roll. Extrusion coating is distinct from a lamination technique.

The term "lamination technique" is used herein in its conventional sense refer to applying adhesive backing materials to greige goods by first forming the adhesive backing material as a solidified or substantially solidified film or sheet and thereafter, in a separate processing step, reheating or elevating the temperature of the film or sheet before applying it to the back surface of the primary backing material. The term "heat content" is used herein to refer to the mathematical product of the heat capacity and specific gravity of a filler. Fillers characterized as having high heat content are used in specific embodiments of the present invention to extend the solidification or molten time of adhesive backing materials. The Handbook for Chemical Technicians, Howard J. Strauss and Milton Kaufmann, McGraw Hill Book Company, 1976, Sections 1-4 and 2-1 provides information on the heat capacity and specific gravity of select mineral fillers. The fillers suitable for use in the present invention do not change their physical state (i.e., remain a solid material) over the extrusion coating processing temperature ranges of the present invention.

Preferred high heat content fillers possess a combination of a high specific gravity and a high heat capacity.

The term "implosion agent" is used herein to refer to the use of conventional blowing agents or other compounds which out-gas or cause out-gassing when activated by heat, usually at some particular activation temperature. In the present invention, implosion agents are used to implode or force adhesive backing material into the free space of yarn or fiber bundles.

The term "processing material" is used herein to refer to substances such as spin finishing waxes, equipment oils, sizing agents and the like, which can interfere with the adhesive or physical interfacial interactions of adhesive backing materials. Processing materials can be removed or displaced by a scouring or washing technique of the present invention whereby improved mechanical bonding is accomplished. The terms "polypropylene carpet" and "polypropylene greige goods" are used herein to mean a carpet or greige goods substantially comprised of polypropylene fibers, irrespective of whether the primary backing material for the carpet or greige good is comprised of polypropylene or some other material.

The terms "nylon carpet" and "nylon greige goods" are used herein to mean a carpet or greige goods substantially comprised of nylon fibers, irrespective of whether the primary backing material for the carpet or greige good is comprised of nylon or some other material.

The term "linear" as used to describe ethylene polymers is used herein to mean the polymer backbone of the ethylene polymer lacks measurable or demonstrable long chain branches, e.g., the polymer is substituted with an average of less than 0.01 long branch/1000 carbons.

The term "homogeneous ethylene polymer" as used to describe ethylene polymers is used in the conventional sense in accordance with the original disclosure by Elston in U.S. Pat. No. 3,645,992, to refer to an ethylene polymer in which the comonomer is randomly distributed within a given polymer molecule and wherein substantially all of the polymer molecules have substantially the same ethylene to comonomer molar ratio. As defined herein, both substantially linear ethylene polymers and homogeneously branched linear ethylene are homogeneous ethylene polymers.

Olefin block copolymers, especially ethylene based block interpolymers are described and claimed in various patent applications, including U.S. Pat. No. 7,355,089 (Chang et al.), incorporated herein by reference, WO 2005/090425, WO 2005/090426 and WO 2005/090427.

We have discovered that olefin block copolymers, especially ethylene based block interpolymers, offer unique advantages for extrusion coated carpet backing applications, especially for commercial and residential carpet markets. Olefin block copolymers, especially ethylene based block interpolymers, have low solidification temperatures, good adhesion to polypropylene, and low modulus relative to conventional ethylene polymers such as low density polyethylene (LDPE), heterogeneously branched linear low density polyethylene (LLDPE), high density polyethylene (HDPE), and heterogeneously branched ultra low density polyethylene (ULDPE). As such, olefin block copolymer, especially ethylene based block interpolymers are useful for making carpet fibers, primary backing materials, adhesive backing materials and optional secondary backing materials. However, olefin block copolymer, especially ethylene based block interpolymers are particularly useful as adhesive backing materials for tufted carpet and non-tufted carpet (e.g., needle-punched carpet) and are especially useful for tufted carpets.

In the present invention, during extrusion coating of the backside of carpet to apply an adhesive backing material, properly selected ethylene block interpolymers show good penetration of carpet yarns (fiber bundles) and also allow good consolidation of the fibers within the yarn.

When used for tufted carpets, the tuft bind strength and abrasion resistance of the carpet is increased by the penetration of ethylene block interpolymers into the yarn. Preferably, a tuft bind (or tuft lock) strength of 3.25 pounds (1.5 kg) or more is achieved, more preferably 5 pounds (2.3 kg) or more and most preferably 7.5 pounds (3.4 kg) or more. In addition to improved penetration of the yarn, tuft bind strength can be also be increased by increasing the molecular weight of the polymer. However, a higher polymer molecular weight selected for improved tuft bind strength is contra to the requirement of a lower polymer molecular weight which is generally needed for good yarn penetration and good extrusion coatability. Also, higher polymer densities are desirable for improved chemical and barrier resistance, yet higher densities invariably yield stiffer carpets. As such, polymer properties must be chosen such that a balance is maintained between extrusion coatability and abrasion resistance as well as between chemical resistance and carpet flexibility.

When carpet greige goods are backed with properly selected ethylene block interpolymers, the low flexural modulus of these polymers offers advantages in ease of carpet installation and general carpet handling.

Ethylene block interpolymers, in particular, when employed as an adhesive backing material show enhanced mechanical adhesion to polypropylene which improves the consolidation and delamination resistance of the various carpet layers and components, i.e., polypropylene fibers, fiber bundles, the primary backing material, the adhesive backing material and the secondary backing material when optionally applied. Consequently, exceptionally good abrasion resistance and tuft bind strength can be obtained. Good abrasion resistance is especially important in commercial carpet cleaning operations as good abrasion resistance generally improves carpet durability.

Properly selected ethylene block interpolymers can allow the elimination of secondary backing materials and as such can result in significant manufacturing cost savings. In addition, carpets adhesively backed with an ethylene block interpolymer can provide a substantial fluid and particle barrier which enhances the hygienic properties of carpet. An ethylene block interpolymer adhesive backing material can allow totally recyclable carpet products particularly where the carpet comprises polypropylene fibers.

In addition, the mixture of an ethylene block interpolymer with a fiber-grade polypropylene resin can result in an impact modified recycle composition which is useful for injection molding and other molding applications as well as reuse in carpet construction, for example, as the primary backing material or as a blend component of the adhesive backing material polymer composition. That is, polyolefin polymer mixtures can involve sufficiently similar polymer chemistries, compatibilities, and/or miscibilities to permit good recyclability without having sufficient similarities to permit integral fusion.

The preferred olefin block copolymer, especially ethylene based block copolymers has a single melting peak between −30° C. and 150° C., as determined using differential scanning calorimetry. Preferably, the ethylene based block interpolymer has a single differential scanning calorimetry, DSC, melting peak between −30° C. and 150° C., usually between about 100 and about 130° C. The ethylene based block interpolymers used in the present invention are characterized by a single DSC melting peak. The single melting peak is determined using a differential scanning calorimeter standardized with indium and deionized water. The method involves 5-7 mg sample sizes, a "first heat" to about 140° C. which is held for 4 minutes, a cool down at 10° C./min. to −30° C. which is held for 3 minutes, and heat up at 10° C./min. to 150° C. for the "second heat". The single melting peak is taken from the "second heat" heat flow vs. temperature curve. Total heat of fusion of the polymer is calculated from the area under the curve.

Whole polymer product samples and individual polymer components are analyzed by gel permeation chromatography (GPC) on a Waters 150 high temperature chromatographic unit equipped with three mixed porosity columns (Polymer Laboratories $10^3$, $10^4$, $10^5$ and $10^6$ A), operating at a system temperature of 140° C. The solvent is 1,2,4-trichlorobenzene, from which 0.3 percent by weight solutions of the samples are prepared for injection. The flow rate is 1.0 milliliters/minute and the injection size is microliters. The molecular weight determination with is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in Journal of Polymer Science, Polymer Letters, Vol. 6, p. 621, 1968) to derive the following equation: $M_{polyethylene}=a(M_{polystyrene})^b$ In this equation, a=0.4316 and b=1.0. Weight average molecular weight, Mw, and number average molecular weight, Mn, are calculated in the usual manner according to the following formula: $M_w=\Sigma w_i*(M_i)$; where $w_i$ and $M_i$ are the weight fraction and molecular weight of the $i^{th}$ fraction eluting from the GPC column. Block Index, and hard/soft segment split can be measured according to U.S. Ser. No. 11/376,835 and EP 1 716 190 B1.

Suitable olefin block copolymer, especially ethylene based block interpolymers for use in the present invention include interpolymers of ethylene and at least one alpha-olefin prepared by a solution, gas phase or slurry polymerization process or combinations thereof. Suitable alpha-olefins are represented by the following formula: $CH_2=CHR^*$ where R is a hydrocarbyl radical. Further, R may be a hydrocarbyl radical having from one to twenty carbon atoms and as such the formula includes $C_3$-$C_{20}$ alpha-olefins. Suitable alpha-olefins for use as comonomers include propylene, 1-butene, 1-isobutylene, 1-pentene, 1-hexene, 4-methyl-1-pentene, 1-heptene and 1-octene, as well as other comonomer types such as styrene, halo- or alkyl-substituted styrenes, tetrafluoroethylene, vinyl benzocyclobutane, 1,4-hexadiene, 1,7-octadiene, and cycloalkenes, e.g., cyclopentene, cyclohexene and cyclooctene. Preferably, the comonomer will be 1-butene, 1-pentene, 4-methyl-1-pentene, 1-hexene, 1-heptene, 1-octene, or mixtures thereof, as adhesive backing materials comprised of higher alpha-olefins will have especially improved toughness. By the term "interpolymer" is meant that the main (dominant) monomer is copolymerized with at least one other comonomer. Thus the term interpolymer can refer to a copolymer as well as terpolymers (3 monomers) and the like. However, most preferably, the comonomer will be 1-octene and the ethylene polymer will be prepared in a solution process.

The density of the ethylene based block interpolymers, as measured in accordance with ASTM D-792, generally does not exceed 0.92 g/cc, and is generally in the range from about 0.85 g/cc to about 0.92 g/cc, preferably from about 0.86 g/cc to about 0.91 g/cc, and especially from about 0.86 g/cc to about 0.90 g/cc. The molecular weight of the ethylene based block copolymer is conveniently indicated using a melt index measurement according to ASTM D-1238, Condition 190 C/2.16 kg (formerly known as "Condition (E)" and also known as $I_2$). Melt index is inversely proportional to the molecular weight of the polymer. Thus, the higher the molecular weight, the lower the melt index, although the relationship is not linear. The melt index for the ethylene based block interpolymers is generally from about 1 grams/10 minutes (g/10 min) to about 500 g/10 min, preferably about 2 g/10 min. to about 300 g/10 min., more preferably from about 5 g/10 min to about 100 g/10 min., especially from about 10 g/10 min. to about 50 g/10 min., and most especially about 25 to about 35 g/10 min. Another measurement useful in characterizing the molecular weight of the ethylene based block interpolymers is conveniently indicated using a melt index measurement according to ASTM D1238, Condition 190° C./10 kg (formerly known as "Condition (N)" and also known as $I_{10}$). The ratio of the $I_{10}$ and the $I_2$ melt index terms is the melt flow ratio and is designated as $I_{10}/I_2$. The $I_{10}/I_2$ ratio of the ethylene based block interpolymers is at least 6.5, preferably at least 7, especially at least 8.

Preferred ethylene polymers for us in the present invention have a relatively low modulus. That is, the ethylene polymer is characterized as having a 2% secant modulus less than 24,000 psi (163.3 MPa), especially less than 19,000 psi (129.3 MPa) and most especially less than 14,000 psi (95.2 MPa), as measured in accordance with ASTM D790.

Preferred ethylene polymers for use in the present invention are substantially amorphous or totally amorphous. That is, the ethylene polymer is characterized as having a percent crystallinity less than 40 percent, preferably less than 30 percent, more preferably less than 20 percent and most preferably less than 10 percent, as measured by differential scanning calorimetry using the equation percent crystallinity=(Hf/292)*100, where Hf is the heat of fusion in Joules/gram. The olefin block copolymer, especially ethylene based block interpolymers can be used alone or can be blended or mixed with one or more synthetic or natural polymeric material. Suitable polymers for blending or mixing with olefin block copolymer, especially ethylene based block interpolymers used in the present invention include, but are not limited to, another olefin block copolymer, especially ethylene based block interpolymers, low density polyethylene, heterogeneously branched LLDPE, heterogeneously branched ULDPE, medium density polyethylene, high density polyethylene, grafted polyethylene (e.g. a maleic anhydride extrusion grafted heterogeneously branched linear low polyethylene or a maleic anhydride extrusion grafted (MAH-g) homogeneously branched ultra low density polyethylene), ethylene acrylic acid copolymer, ethylene vinyl acetate copolymer, ethylene ethyl acrylate copolymer, polystyrene, polypropylene, polyester, polyurethane, polybutylene, polyamide, polycarbonate, rubbers, ethylene propylene polymers, ethylene styrene polymers, styrene block copolymers, and vulcanates. The actual blending or mixing of various polymers may be conveniently accomplished by any technique known in the art including, but not limited to, melt extrusion compounding, dry blending, roll milling, melt mixing such as in a Banbury mixer and multiple reactor polymerization. Preferred blends or mixtures include an olefin block copolymer, especially ethylene based block interpolymers and a heterogeneously branched ethylene alpha-olefin interpolymer wherein the alpha-olefin is a $C_3$-$C_8$ alpha-olefin prepared using two reactors operated in parallel or in series with different catalyst systems employed in each reactor.

A range of resin properties, processing conditions and equipment configurations have been discovered for extrusion coatable carpet backing systems that deliver performance similar or better than incumbent latex and polyurethane systems. Polyolefin precoats, laminate coats, and foam coats can be prepared by methods known to those of ordinary skill in the art of preparing such backings. Precoats, laminate coats and foam coats prepared from dispersions are described in P. L. Fitzgerald, "Integral Dispersion Foam Carpet Cushioning", J. Coat. Fab. 1977, Vol. 7 (pp. 107-120), and in R. P. Brentin, "Dispersion Coating Systems for Carpet Backing", J. Coat. Fab. 1982, Vol. 12 (pp. 82-91).

Preferably, two layers of resin, each layer comprising a different resin, are extruded with the layer applied directly onto the backside of the primary backing material (first layer) having a higher melt index than the second layer which is applied onto the backside of the first layer. Since it is the first layer which is relied on to encapsulate and penetrate the yarn, this layer should have a melt index high enough (melt viscosity low enough) to promote encapsulation and penetration of the yarn. The second layer, which is generally not relied on to encapsulate and penetrate the yarn, may be used either as the bottom surface of the carpet or to facilitate the application of an optional secondary backing material. For both of these uses, it is preferred to have a lower melt index to provide higher strength after cooling. In addition, because it is not relied on for encapsulating or penetrating the fiber bundles, a resin of lower quality and/or less tightly controlled properties may be used in the second layer. In a preferred embodiment, the second layer is a recycled feedstock.

Also, the first and second layers may consist of different polymer chemistries or compositions. For example, the first layer can be comprised of an adhesive polymer (as an additive or as the composition of the entire layer) such as, but not limited to, an ethylene vinyl acetate copolymer, an ethylene acrylic acid copolymer or a maleic anhydride/ethylene polymer graft (preferably, a ethylene block inter polymer/maleic anhydride extrusion graft or a high density polyethylene/maleic anhydride extrusion graft) and the second layer can be comprised of a non-polar polymer such as a olefin block copolymer, especially ethylene based block copolymers, a low density polyethylene or ultra low density polyethylene. Alternately, the first layer can be comprised of a non-polar polymer and the second layer can be comprised of an adhesive polymer. Preferably, the first layer has an $I_2$ melt index between about 5 and about 175 g/10 minutes and the second layer has an $I_2$ melt index between about 1 and about 70 g/10 min. Most preferably, the first layer has an $I_2$ melt index between about 30 and about 70 g/10 minutes and the second layer has an $I_2$ melt index between about 10 and about 30 g/10 min. It is also preferred to extrude two layers of a single polymer composition so as to have greater control over the thickness or weight of the resin applied to the carpet.

In alternative embodiments, three or more layers of the resin can be extruded on the back surface of the primary backing material to achieve even higher coat weights and/or to obtain a more gradual transition between the first and last layer applied. Preferably, a dual lip die is used to apply two layers. Alternatively, two or more extrusion stations or a single lip coextrusion die can be used to apply these two or more layers. Another aspect of the present invention is the use of modified olefin block copolymer, especially ethylene based block interpolymers. Suitable grafting techniques are described in U.S. Pat. Nos. 4,762,890; 4,927,888; 4,230,830; 3,873,643; and 3,882,194, the disclosures of each incorporated herein in its entirety.

Preferred adhesive polymeric additives for use in the present invention are maleic anhydride grafts wherein maleic anhydride is grafted onto an ethylene polymer at a concentration of about 0.1 to about 5.0 weight percent, preferably about 0.5 to about 1.5 weight percent. The use of ethylene polymer/maleic anhydride grafts as adhesive polymeric additives in the present invention significantly improves the performance and operating window of extrusion coated olefin block copolymer, especially ethylene based block interpolymers as the adhesive backing material, especially for polar polymer such as for example, but not limited to, nylon and polyester faced carpets. The improvement pertained to substantially higher comparative abrasion resistance and tuft bind strength. The improvement was surprising in that graft adhesives are generally known to require extended molten or semi-molten contact times for improved performance and function as interlayer adhesives for films and coatings where there is a continuous substrate as opposed to the discontinuous interface existent in carpet construction. Preferred ethylene polymers for use as the grafted host polymer include low density polyethylene (LDPE), high density polyethylene (HDPE), heterogeneously branched linear low density polyethylene (LLDPE), homogeneously branched linear ethylene polymers and substantially linear ethylene polymers. Preferred host ethylene polymers have a polymer density greater than or equal to 0.915 g/cc and most preferably greater than or equal to 0.92 g/cc. Ethylene based block interpolymers and high density polyethylene are the preferred host ethylene polymers.

In this aspect of the present invention, the adhesive polymeric additive is added to the olefin block copolymer, especially ethylene based block copolymers, at a level in the range of from about 0.5 to about 30 weight percent, preferably from about 1 to about 20 weight percent, more preferably from about 5 to about 15 weight percent based on the total weight of the polymer. For the preferred ethylene polymer maleic anhydride grafts, additions should provide a final maleic anhydride concentration in the range of from about 0.01 to about 0.5 weight percent, preferably from about 0.05 to about 0.2 weight percent based on the total weight of the polymer. The extruded polymer(s) can either be used neat, or can have one or more additive included. A preferred additive is an inorganic filler, more preferably, an inorganic filler with a high heat content. Examples of such fillers include, but are not limited to, coal fly ash, calcium carbonate, aluminum trihydrate, talc, barite. High heat content fillers are believed to be advantageous in the invention because such fillers allow the extrudate to remain at elevated temperatures longer with the beneficial result of providing enhanced encapsulation and penetration. That is, normally fillers are added to carpet backing materials to merely add bulk (i.e. as extenders) or to impart insulating and sound dampening characteristics. However, we have found that inorganic mineral fillers that have high heat contents surprisingly improve yarn encapsulation and penetration which in turn improves the performance of the abrasion resistance and tuft bind strength of extrusion coated carpet samples.

Preferably, a high heat content filler is added at a level of between about 1 and about 75 weight percent of the total extrudate, more preferably between about 15 and about weight percent and most preferably between about 20 weight percent and 50 weight percent. Such fillers will have a specific heat content of greater than or equal to 0.4 cal-cc/° C. (1.8 Joules-cc/° C.), preferably greater than or equal to 0.5 cal-cc/° C. (2 Joules-cm$^3$/° C.), more preferably greater than or equal to 0.6 cal-cc/° C. (2.5 Joules-cm$^3$/° C.), and most preferably greater than or equal to about 0.7 cal-cc/° C. (2.9 Joules-cm$^3$/° C.). Representative examples of high heat content fillers for use in the present invention include, but are not limited to, limestone (primarily $CaCO_3$), marble, quartz, silica, and barite (primarily $BaSO_4$). The high heat content fillers should be ground or precipitated to a size that can be conveniently incorporated in an extrusion coating melt stream. Suitable particle sizes range from about 1 to about 100 microns. If a foamed backing is desired on the carpet, a blowing agent can be added to the adhesive backing material and/or the optional secondary backing material. If used, the blowing agents are preferably conventional, heat activated blowing agents such as azodicarbonamide, toluene sulfonyl semicarbazide, and oxy bis(benzene sulfonyl)hydrazide. The amount of blowing agent added depends on the degree of foaming sought. A typical level of blowing agent is between about 0.1 and about 1.0 weight percent.

Other additives can also be included in the adhesive backing material, to the extent that they do not interfere with the enhanced properties discovered by Applicants. For example, antioxidants such as sterically hindered phenols, sterically hindered amines and phospites may be used. Suitable antioxidants include Irganox™ 1010 from Ciba-Geigy which is a hindered phenol and Irgafos™ 168 from Ciba-Geigy which is a phosphite. Other possible additives include antiblock additives, pigments and colorants, antistatic agents, antimicrobial agents (such as quaternary ammonium salts) and chill roll release additives (such as fatty acid amides). As noted above the carpet of the invention preferably also includes a secondary backing material. Preferably, the secondary backing material is laminated directly to the extruded layer(s) while the extrudate is still molten after extrusion coating. It has been found that this technique can improve the penetration of the extrusion coating into the primary backing.

Alternatively, the secondary backing material can be laminated in a later step by reheating and/or remelting at least the outermost portion of the extruded layer or by a coextrusion coating technique using at least two dedicated extruders. Also, the secondary backing material can be laminated through some other means, such as by interposing a layer of a polymeric adhesive material between the adhesive backing material and the secondary backing material.

Suitable polymeric adhesive materials include, but are not limited to, ethylene acrylic acid (EAA) copolymers, ionomers and maleic anhydride grafted polyethylene compositions. The extrusion backed carpet construction and the methods described herein are particularly suited for making carpet tile. In a preferred embodiment of carpet tile, the carpet included from about 5 to about 200 OSY (about 176.8 to about 7,074 cm$^3$/m$^2$) of extruded adhesive backing. More preferably, the carpet for tile includes from about 30 to about 80 OSY (about 1061 to about 2,830 cm$^3$/m$^2$) of extruded backing, most preferably, 50 OSY (1,768 cm$^3$/m$^2$). Preferably, the carpet for carpet tile receives its extruded backing in two passes, i.e., to apply two layers of the extruded backing. Applying the extruded backing in two passes allows the opportunity to apply a first and second layer which have different physical and/or chemical properties. As noted above, it is sometimes preferable to apply a polymer with a higher melt index adjacent the primary backing, and a polymer with a lower melt index below that. In addition, it can also be preferably to use an extrudate with a lower filler content in the layer next to the primary backing and an extrudate with a higher filler content in the layer below that. In one preferred embodiment, the layer next to the primary backing includes a filler loading of 30 percent by weight and the layer below that includes a filler loading of 60 percent by weight. The lower filler content is believed to provide better penetration of the primary backing and back stitches in the carpet by the extrudate.

The carpet tile may include a secondary backing fabric below the second layer of extruded backing. Suitable materials for the secondary backing fabric include those described above. However, it is presently not preferred to include a secondary backing fabric on carpet tile. Carpet tile is typically made by producing a length of backed carpet and then cutting the carpet into the appropriate sized squares. In the United States, the most common size is 18 inches (45.7 cm) square. In the rest of the world, the most common size is 50 cm square.

Carpet tiles have a tendency to grow in hot, humid environments. This is a significant problem as the tiles are installed edge-to-edge with no room for expansion. Buckling of the tile system can occur even if expansions are as low as 0.08%. The amount of growth in tiles is related to the inherent growth of the various layers of the tile. The yarn is often made of nylon which is known to swell upon exposure to humid environments. This swelling is often arrested by the pre-coat which can hold the pre-coated carpet composite in place at most all temperatures seen in the application. However, issues can arise if the backing or the adhesive or cap coat layers expand upon exposure to heat. For this reason, layers of fiberglass nonwoven are often imbedded in between the adhesive and cap coat layers. However, despite such efforts tiles are known to grow due to the inherent growth of that polymer. Coefficient of Linear Thermal Expansion (CLTE or CTE) is a measure of this growth tendency.

The CLTE is only one part of the prediction of growth of polymeric backing layers in carpet tiles. This is because the classical measurement of CLTE is done with little or no force applied upon the sample. Particularly with soft materials such as those used for carpet backing, the even small forces applied to the sample by testing devices such as dilatometers and TMA devices can alter the growth measured. Growth can occur in either the X (cross), Y (machine) or Z (thickness) direction. In the case of the actual carpet tile, the X and Y directional growth is limited by the pre-coated carpet, the imbedded glass layer and the floor to which it is adhered. These constraints tend to force the thermal expansion of the adhesive and cap coats into the Z-direction, which is the "path of least resistance". The degree to which this occurs related to the amount of force with which a material grows, hereafter called "growth tension". Such soft materials with a high growth tension will expand more in the X and Y directions than materials with low growth tensions.

Growth Tension Measurement

Growth tension is measured using a TA Instrument RSA III (Rheometric Solids Analyzer III). Compression molded sheets of each sample of 0.8-1 mm thickness are cut into 12.7 mm width rectangular shape and loaded into the instrument. During the test, the strain and tension are set so that the clamp distance (length) is fixed at 20 mm. A temperature ramp is programmed to run from room temperature until melting at 20° C./min. The force is recorded during the temperature ramp, from which the growth tension is calculated according to Equation 1.

$$\sigma(MPa) = \frac{F}{Area} = \frac{F(gf) * 0.0098(N/gf)}{t(mm) * W(mm)} \quad (1)$$

in which σ is the growth tension, F is the growth force, Area is the film cross-sectional area, t is the film thickness, and W is the film width. The growth tension value at 40° C. is used for comparison between different samples. This procedure is done three times and the average growth tension is reported for each sample.

Residual Stress Measurement

Residual stress properties are measured using small tensile bar per ASTM D1708 sample geometry using Instron. The sample is drawn at 100%/min to 25% and held at 25% for 30 min, during which the stress is recorded with time. The test is conducted in an environmental chamber, which is set at 40° C. to represent an extreme temperature an installation might experience. The percentage of residual stress after 30 min is used for comparison between different samples. This procedure is done twice and the average residual stress is reported for each sample.

TABLE 1

Growth tension at 40° C.

| | Psi |
|---|---|
| Comparative Ex. 1 | 15 |
| Example 1 | 5 |
| Example 1 (repeated) | 10 |

Comparative example 1 is a formulation comprising 24 weight percent of a substantially linear ethylene/1-octene copolymer having a melt index of about 30 g/10 minutes and a density of about 0.885 g/cm³; about 4 weight percent of AMPLIFY GR 204, which is an ethylene polymer having a melt index of 65 g/10 minutes and a density of about 0.952 g/cm³ subsequently grafted with maleic anhydride to about 1.2 weight percent maleic anhydride and a final melt index of about 12 g/10 minutes; about 60 weight percent filler; about 1 weight percent oil (Chevron/Phillips Paralux 6001); and about 11 weight percent tackifier (see example from top of column 59 of U.S. Pat. No. 7,338,698). This comp. ex. 1 formulation has a storage modulus (G') of about 7.8 MPa at 70° C. G' is obtained from Dynamic Mechanical Spectroscopy data of the compression molded composite films. It is measured using Rheometrics ARES dynamic mechanical analyzer in torsion mode. The test is conducted from a temperature below $T_g$ to 200° C. at a frequency of 10 rad/s. G' value at 70 degree C. is reported.

Example 1 is a formulation comprising 24 weight percent of an ethylene/1-octene multiblock copolymer having a melt index of about 15 g/10 minutes, a density of about 0.877 g/cm³, about 25% hard segment, about 75% soft segment and a block index of about 0.4 to about 0.6; about 4 weight percent of AMPLIFY GR 204, which is an ethylene polymer having a melt index of 65 g/10 minutes and a density of about 0.952 g/cm³ subsequently grafted with maleic anhydride to about 1.2 weight percent maleic anhydride and a final melt index of about 12 g/10 minutes; about 60 weight percent coal ash; about 1 weight percent oil (Chevron/Phillips Paralux 6001); and about 11 weight percent tackifier Eastotac H115R.

Other properties of the ethylene/1-octene multiblock copolymer include those listed below:

| I10 | I10/I2 ratio | $T_m$ (° C.) | $T_c$ (° C.) | Mn (g/mol) | Mw (g/mol) | Mw/Mn Ratio | Heat of Fusion (J/g) |
|---|---|---|---|---|---|---|---|
| 113 | 7.6 | 120 | 104 | 11760 | 63850 | 5.4 | 50.4 |

| Cryst (wt %) | Total C8 (mol %) | Soft Segment C8 (mol %) | Hard Segment C8 (mol %) | % Soft Segment (%) | % Hard Segment (%) |
|---|---|---|---|---|---|
| 17.4 | 13.1 | 18.5 | 0.9 | 75 | 25 |

TABLE 2

Percent Residual Stress at 25% strain

| | percent |
|---|---|
| Comparative Ex. 1 | 67 |
| Example 1 | 54 |

Comparative example 1 is the same formulation as described above.

Example 1 is the same formulation as described above.

Combinations of low growth tension and low residual stress can be achieved by using very low modulus materials. These low moduli can be accomplished by plasticization such as the case with PVC or by using very low crystallinity materials such as ethylene copolymers with high copolymer levels. However, these very low crystallinity materials typically melt at low temperatures. For carpet and carpet tile applications, shipment temperatures can reach as high as 80 C. Therefore, the melting points of backing materials must be kept in this range or higher.

For polymers with lower melting points, curing or cross linking can be used to raise the molecular weight to prevent polymer flow at high temperatures, preferably without significantly affecting the growth tension and residual stress character. This can be accomplished with peroxide cross-linking, e-beaming and other similar methods.

In still another alternative embodiment, a pressure sensitive adhesive is applied to the bottom surface of the backed carpet and a release sheet is included. In this way, a "Peel and stick" carpet is produced. This is particularly beneficial when the carpet is to be cut into tiles. Examples of suitable pressure sensitive adhesives include ethylene vinyl acetate copolymers and substantially linear ethylene polymers and ethylene-based multiblock polymers formulated with tackifiers and polymeric waxes. The release sheet can be made from conventional polymers and/or paper products. Preferably, the release sheet is made of polyester/wax formulation. It has been determined that the pressure sensitive adhesive is best applied directly to the adhesive backing material while the adhesive backing material is still at an elevated temperature from the extrusion coating process. A preferred technique is to extrusion laminate the pressure sensitive adhesive with the adhesive backing material; that is, to apply the pressure sensitive adhesive at nip. Alternately, the adhesive backing material can be reheated before the pressure sensitive adhesive is applied.

OBC is most compatible with fully hydrogenated tackifiers with molecular weights less than 2500 g/mol (Mz). Best tackifiers to use with OBC are: 1) hydrogenated aromatics such as Regalite R1090 and R1100 (made by Eastman Chemical), 2) fully hydrogenated hydrocarbons such as Eastotac H100L and the Escorez 5600 series, 3) partially hydrogenated hydrocarbons such as the Escorez 5400 series, and 4) hydrogenated pure monomer resins such as Regalrez 1085 and 1094.

Appropriate Oil: A selection of mineral and naphthenic oils were formulated with OBC Tackifier. Best candidates include Chevron-Phillips' Paralux 6001 (paraffinic), Ergon-West Virginia's Hyprene P100N (hydrotreated paraffinic), and Crompton-Witco's Kaydol and Sonneborn's Hydrobrite 550 mineral oils (62-67.5% paraffinic).

Appropriate Waxes: Waxes including waxes manufactured from crude oil refining, such paraffin wax, microcrystalline wax, and synthetic waxes, such as Fischer-Tropsch waxes Appropriate Fillers:

Glass filler: Glass powder is typically produced by recycling post consumer glass products, in particular automotive and architectural glass, also known as plate glass. However, other types of glass, such as flint glass, E glass, borosilicate glass, brown glass (bottle glass), and green glass (bottle glass) and combinations thereof may also be used to form the glass powder. Therefore, to insure adequate dispersion of the glass powder in the filler, while maintaining adequate viscosities, the average size of the glass powder may range from approximately 100 mesh to 400 mesh. More particularly, in some embodiments, the average size of the glass powder may be approximately 200 mesh.

Other fillers: The glass powder may make up 100% of the filler. Additionally, the glass powder may be used in conjunction with conventional fillers to form a composite filler. For example, in some embodiments, the glass powder may be mixed with carbonates such as calcium carbonate ($CaCO_3$), cesium carbonate ($CsCO_3$), strontium carbonate ($StCO_3$), and magnesium carbonate ($MgCO_3$); sulfates such as barium sulfate ($BaSO_3$); oxides such as fly ash, iron oxide ($Fe_2O_3$), alumina oxide ($Al_2O_3$), tungsten oxide ($Tg_2O_3$), titanium oxide ($Ti_2O_3$), and silicon oxide ($Si_2O_3$); silicates, such as clay; metal salts; fly ash; and the like.

Surfactants: The adhesive compound may also include additional additives. For example, these additives may include a surfactant to help keep the filler uniformly dispersed in the adhesive. Suitable surfactants may include nonionic, anionic, and fluorosurfactants. In addition to uniformly dispersing the filler throughout the adhesive compound, the surfactants may also be used as a froth aid to increase the emulsification of adhesives.

Antioxidants: When polymer adhesives, especially hot melt adhesives, are heated, they may become susceptible to thermo-oxidation degradation. Therefore, to reduce the possibility of thermo-oxidation degradation, the adhesive composition of the present invention may also contain an antioxidant such as Irganox 1010, 1092, etc.

Appropriate ranges for PSA and HMA compositions:
Filler: 40-70%,
Tackifying Resin 20-40%;
Oil 0-10%;
OBC—balance to achieve 100%.

Waxes useful in embodiments of the present invention include Fischer-Tropsch waxes, petroleum-derived waxes, and synthetic waxes. These waxes are commercially available, from Sasol company, for example. Large oil companies such as Shell Oil, ExxonMobil, and other oil refiners supply petroleum waxes suitable for use in these applications. Montan waxes are another type of suitable waxes. Most of these waxes are obtained in the process of refining lube oil, where the waxes are separated from the lube oil stock and refined into various fractions of waxes including paraffins and microcrystalline waxes. Formulators such as Astor Wax, IGI, and Moore & Munger also supply waxes suitable for these applications. These waxes are resold as is from the oil companies and/or formulated and repackaged to meet the specific needs of customers.

In addition to synthetic and/or petroleum-derived waxes, a number of other "natural" waxes may be used, such as carnauba waxes, and commercially available high triglyceride waxes derived from the processing of natural oil-containing commodities such as soybeans, palm and other crops, from which oil can be obtained.

Suitable waxes may be obtained from Archer Daniels Midland (Decatur Ill.) designated by their product number 86-197-0; Cargill Incorporated (Wayzata, Minn.) designated by their product number 800 mrcs0000u; and other sources under a generic name 'hydrogenated soybean oil'. Palm oil wax may be obtained by Custom Shortenings & Oils (Richmond, Va.) and is designated as Master Chef Stable Flake-P. Soybean wax is also distributed by Marcus Oil and Chemical Corp. (Houston, Tex.) under the designation of "Marcus Nat 155". These waxes can also be used as food additives. In embodiments involving PSAs, the waxes listed above may be replaced with oils (which may be similarly constituted).

Tackifying resins useful in the present invention include aliphatic, cycloaliphatic, and aromatic hydrocarbons and modified hydrocarbons and hydrogenated versions; terpenes and modified terpenes and hydrogenated versions; and rosins and rosin derivatives and hydrogenated versions; and mixtures thereof. These tackifying resins have a ring and ball softening point from 70° C. to 150° C., and will typically have a viscosity at 350° F. (177° C.), as measured using a Brookfield viscometer, of no more than 2000 centipoise. They are also available with differing levels of hydrogenation, or saturation, which is another commonly used term.

Useful examples include Eastotac™ H-100, H-115 and H-130 from Eastman Chemical Co. (Kingsport, Tenn.), especially when incorporated at levels of up to about 15 weight percent of the total composition, which are partially hydrogenated cycloaliphatic petroleum hydrocarbon resins with softening points of 100° C., 115° C. and 130° C., respectively. These are available in the E grade, the R grade, the L grade and the W grade, indicating differing levels of hydrogenation with E being the least hydrogenated and W being the most hydrogenated. The E grade has a bromine number of 15, the R grade a bromine number of 5, the L grade a bromine number of 3, and the W grade a bromine number of 1. Eastotac™ H-142R from Eastman Chemical Co. has a softening point of about 140° C. Other useful tackifying resins include Escorez™ 5300, 5400, and 5637, partially hydrogenated cycloaliphatic petroleum hydrocarbon resins; and Escorez™ 5600, a partially hydrogenated aromatic modified petroleum hydrocarbon resin, which are available from Exxon Chemical Co. (Houston, Tex.).; and Wingtack™ Extra, which is an aliphatic, aromatic petroleum hydrocarbon resin available from Goodyear Chemical Co. (Akron, Ohio).

There are numerous types of rosins and modified rosins available with differing levels of hydrogenation including gum rosins, wood rosins, tall-oil rosins, distilled rosins, dimerized rosins, and polymerized rosins. Some specific modified rosins include glycerol and pentaerythritol esters of wood rosins and tall-oil rosins. Commercially available grades include, but are not limited to, Sylvatac™ 1103, a pentaerythritol rosin ester available from Arizona Chemical Co. (Jacksonville, Fla.); Unitac™ R-100 Lite, a pentaerythritol rosin ester available from Union Camp (Wayne, N.J.); Permalyn™ 305, an erythritol modified wood rosin available from Hercules, Inc. (Brunswick, Ga.) and Foral 105, which is a highly hydrogenated pentaerythritol rosin ester also available from Hercules, Inc. (Brunswick, Ga.). Sylvatac™ R-85 and 295 are 85° C. and 95° C. melting point rosin acids available from Arizona Chemical Co. and Foral AX is a 70° C. melting point hydrogenated rosin acid available from Hercules, Inc. Nirez V-2040 is a phenolic modified terpene resin available from Arizona Chemical Co.

Another exemplary tackifier, Piccotac™ 115 available from Eastman Chemical Co., has a viscosity at 350° F. (177° C.) of about 1600 centipoise. Other typical tackifiers have viscosities at 350° F. (177° C.) of much less than 1600 centipoise, for instance, from 50 to 300 centipoise.

Exemplary aliphatic resins include those available under the trade names Eastotac™, Escorez™, Piccotac™, Mercures™, Wingtack™, Hi-Rez™, Quintone™, Tackirol™, etc. Exemplary polyterpene resins include those available under the trade designations Nirez™, Piccolyte™, Wingtack™, Zonarez™, etc. Exemplary hydrogenated resins include those available under the trade names Escorez™, Arkon™, Clearon™, etc. These tackifiers may be employed with the polymers of the present invention, providing they are used at compatible levels.

In certain applications of the present invention, it is anticipated an adhesive may be prepared without the use of a tackifier or with a minimal quantity of tackifier. An adhesive may also prepared without a wax, such as a blend of a polymer and a tackifying resin.

Tackifiers added to adhesives can be characterized by parameters such as their softening points, specific gravities, or by acid number. A tackifier can be selected from among the variety of tackifiers, as described above but not limited thereto, and from tackifiers characterized by a range of acid numbers, such as acid numbers between 0 and 100, more preferably an acid number between 0 and 25.8, and most preferably a tackifier having an acid number between 3-10.

In embodiments of the present invention, the polymer and/or wax, tackifying resin, oil, and dispersing agent typically comprise between about 1 to about 74 volume percent of the total dispersion. Water, therefore, typically comprises between about 26 to 99 volume percent. However, several percent of dispersing agents, additives, biocides, and other compounds as explained below may also be present. All intermediate ranges, e.g., 5 to 50 volume percent polymer/wax/tackifying resin/oil, are included within the scope of the instant disclosure. Specific ranges include 50 to 60 percent polymer and/or wax, tackifying resin, oil, and dispersing agent of the total dispersion.

Adhesives of the present invention may also contain a number of additional components, such as a stabilizer, plasticizer, pigment, filler, or antioxidant. Among the applicable stabilizers or antioxidants which can be included in the adhesive composition of the present invention are high molecular weight hindered phenols and multifunctional phenols, such as sulfur-containing and phosphorous-containing phenols. Hindered phenols, known to those skilled in the art, may be described as phenolic compounds, which also contain sterically bulky radicals in close proximity to the phenolic hydroxyl group. Specifically, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency, and correspondingly, its reactivity. It is this hindrance that provides the stabilizing properties of these phenolic compounds.

Representative hindered phenols include; but are not limited to: 2,4,6-trialkylated monohydroxy phenols; 1,3,5-trimethyl-2,4,6-tris-(3,5-d-i-tert-butyl-4-hydroxybenzyl)-benzene; pentaerythritol tetrakis-3(3,5-di-tert-butyl-4-hydroxyphenyl)-propionate, commercially available under the trademark IRGANOX® 1010; n-octadecyl-3(3,5-di-ter-t-butyl-4-hydroxyphenyl)-propionate; 4,4'-methylenebis(4-methyl-6-tert-butyl-phenol); 4,4'-thiobis(6-tert-butyl-o-cresol); 2,6-di-tertbutylphenol; 6-(4-hydroxyphenoxy)-2,4-bis(n-octyl-thio)-1,3,5 triazine; 2-(n-octylthio)ethyl 3,5-di-tert-butyl-4-hydroxy-benzoate; di-n-octadecyl 3,5-di-tert-butyl-4-hydroxy-benzylphosphonate; and sorbitol hexa(3,3,5-di-tert-butyl-4-hydroxy-phenyl)-propionate. Antioxidants include, but are not limited to, butylated hydroxy anisole ("BHA") or butylated hydroxy toluene ("BHT") which may also be utilized to render the formulation more thermally stable. These stabilizers and antioxidants may be added in amounts ranging from approximately 0.01% to approximately 5% by weight of the formulation. Other additives known to the adhesive industry may also be used in conjunction with embodiments of the present invention. The scope of the present invention is not intended to be limited to any particular formulation set forth above or below, but instead is governed by the claims. Other typical additives may include, but are not limited to, nucleating agents, chemicals used to delay crystallization, thickeners, rheology modifiers, antiblocks, oils, and other additives.

What is claimed is:

1. A carpet or carpet tile comprising a primary backing material having a face and a back side, a plurality of fibers attached to the primary backing material and extending from the face of the primary backing material and exposed at the back side of the primary backing material, an optional precoat, an adhesive backing material, an optional dimensional stability layer, an optional cap coat material, and an optional secondary backing material adjacent to the dimensional stability layer or adhesive backing material, wherein at least one of the plurality of fibers, the primary backing material, the optional precoat layer, the adhesive backing material, the optional dimensional stability layer, or the optional secondary backing material comprises at least one non-chlorinated, non-polyvinyl butyral thermoplastic polymer or composition having a growth tension of 40 C of less than about 25 psi and a residual stress at 25% strain of less than about 63%
   wherein the at least one non-chlorinated, non-polyvinyl butyral thermoplastic polymer or composition is an olefin block copolymer (OBC); and,
   wherein the cap coat material or the adhesive backing material further comprises 24 wt % of the OBC,
   (a) at least one filler in an amount of 60% by weight based on the total weight of the material, wherein the filler is selected from the group consisting of coal fly ash, ATH, CaCO$_3$, talc, recycled glass, magnesium hydroxide, ground up tires, and ground up carpet,
   (b) 4 wt % of at least one maleic anhydride grafted high density polyethylene (MAH-g-HDPE),
   (c) 1 wt % of at least one oil,
   (d) optionally, a color additive and
   (e) 11 wt % of at least one tackifier.

2. The carpet or carpet tile of claim 1 wherein the at least one non-chlorinated, non-polyvinyl butyral thermoplastic polymer or composition having a growth tension at 40 C of less than about 20 psi.

3. The carpet or carpet tile of claim 1 wherein the at least one non-chlorinated, non-polyvinyl butyral thermoplastic polymer or composition having a residual stress at 25% strain of less than about 60%.

4. The carpet or carpet tile of claim 1 wherein the at least one non-chlorinated, non-polyvinyl butyral thermoplastic polymer or composition having a growth tension of 40 C of less than or equal to about 1.0 psi.

5. The carpet or carpet tile of claim 1 wherein the at least one non-chlorinated, non-polyvinyl butyral thermoplastic polymer or composition having a residual stress at 25% strain of less than about 55%.

6. The carpet or carpet tile of claim 1 wherein the at least one non-chlorinated, non-polyvinyl butyral thermoplastic polymer or composition has a storage modulus (G') of greater than 4.3 MPa at 70° C.

7. The carpet or carpet tile of claim 1 wherein the olefin block copolymer comprises an ethylene block interpolymer characterized as having an average block index greater than zero and up to about 1.0 and a molecular weight distribution, $M_w/M_n$, greater than about 1.3.

8. The carpet or carpet the of claim 1 wherein the precoat is not optional.

9. The carpet of claim 1 wherein (i) the fibers, primary backing, adhesive backing and optional secondary backing all comprise a polyolefin multi-block polymer, (ii) the olefin monomer chemistry of the adhesive backing differs from that of the fibers and the primary backing, and (iii) the carpet includes a label or literature at the time of sale which represents that the carpet is recyclable without segregation of carpet components.

10. The carpet or carpet tile of claim 1 wherein the olefin block copolymer has an Mw/Mn of 5.4.

11. The carpet or carpet tile of claim 1 wherein the olefin block copolymer comprises 25 wt % hard segment and 75 wt % soft segment.

12. The carpet or carpet tile of claim 1 wherein the olefin block copolymer has a block index from about 0.4 to about 0.6.

13. The carpet or carpet tile of claim 1 wherein the MAH-g-HDPE comprises 1.2 wt % maleic anhydride.

14. The carpet or carpet tile of claim 1 wherein the MAH-g-HDPE has a melt index of 12 g/10 minutes.

* * * * *

UNITED STATES PATENT AND TRADEMARK OFFICE
CERTIFICATE OF CORRECTION

PATENT NO. : 9,885,149 B2
APPLICATION NO. : 12/499667
DATED : February 6, 2018
INVENTOR(S) : Ronald J. Weeks et al.

It is certified that error appears in the above-identified patent and that said Letters Patent is hereby corrected as shown below:

In the Claims

Column 23, Line 8, "1.0" should be --10--

Signed and Sealed this
Eighteenth Day of February, 2020

Andrei Iancu
*Director of the United States Patent and Trademark Office*